United States Patent
Koyama et al.

(10) Patent No.: US 12,216,203 B2
(45) Date of Patent: Feb. 4, 2025

(54) OBJECT DETECTION DEVICE

(71) Applicant: DENSO CORPORATION, Kariya (JP)

(72) Inventors: Yu Koyama, Nisshin (JP); Kohei Kozuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 61 days.

(21) Appl. No.: 18/326,765

(22) Filed: May 31, 2023

(65) Prior Publication Data
US 2023/0305143 A1  Sep. 28, 2023

Related U.S. Application Data

(63) Continuation of application No. PCT/JP2021/044071, filed on Dec. 1, 2021.

(30) Foreign Application Priority Data

Dec. 2, 2020  (JP) .................... 2020-200543

(51) Int. Cl.
*G01S 15/04* (2006.01)
*G01S 7/52* (2006.01)
*G01S 15/931* (2020.01)

(52) U.S. Cl.
CPC ............. *G01S 15/04* (2013.01); *G01S 7/52* (2013.01); *G01S 7/52004* (2013.01); *G01S 15/931* (2013.01)

(58) Field of Classification Search
CPC .......... G01S 15/00; G01S 15/04; G01S 15/32; G01S 15/93; G01S 15/931; G01S 15/539; G01S 7/481; G01S 7/4811; G01S 7/4863; G01S 7/52; G01S 7/53; G01S 7/534
See application file for complete search history.

(56) References Cited

U.S. PATENT DOCUMENTS

2022/0413099 A1* 12/2022 Ono .................... H01S 5/06253

FOREIGN PATENT DOCUMENTS

JP        S63-249071 A       10/1998

* cited by examiner

*Primary Examiner* — Van T Trieu
(74) *Attorney, Agent, or Firm* — Maschoff Brennan

(57) ABSTRACT

An object detection device includes a transceiver that transmits ultrasonic waves encoded with frequency modulation and receives an ultrasonic wave and outputs a reception signal, a first quadrature detector that generates and outputs a complex reception signal based on quadrature detection of the reception signal, a second quadrature detector that generates and outputs a complex reference signal based on quadrature detection of the reference signal, a correlation filter that performs correlation detection between the complex reception signal and the complex reference signal and outputs a correlation signal, and a code determiner that determines a code included in the reception signal based on the correlation signal.

10 Claims, 16 Drawing Sheets

OBJECT DETECTION DEVICE

CROSS-REFERENCE TO RELATED APPLICATION

This application is a continuation application of International Application No. PCT/JP2021/044071 filed Dec. 1, 2021 which designated the U.S. and claims priority to Japanese Patent Application No. 2020-200543 filed Dec. 2, 2020, the contents of each of which are incorporated herein by reference.

BACKGROUND

Technical Field

The present disclosure relates to an object detection device.

Related Art

For obstacle detection using ultrasonic sensors, a technique has been proposed to encode a transmission wave by varying its frequency and determine a code based on the correlation output between the reception signal acquired by a matched filter and a reference signal.

DESCRIPTION OF SPECIFIC EMBODIMENTS

Figure 1:
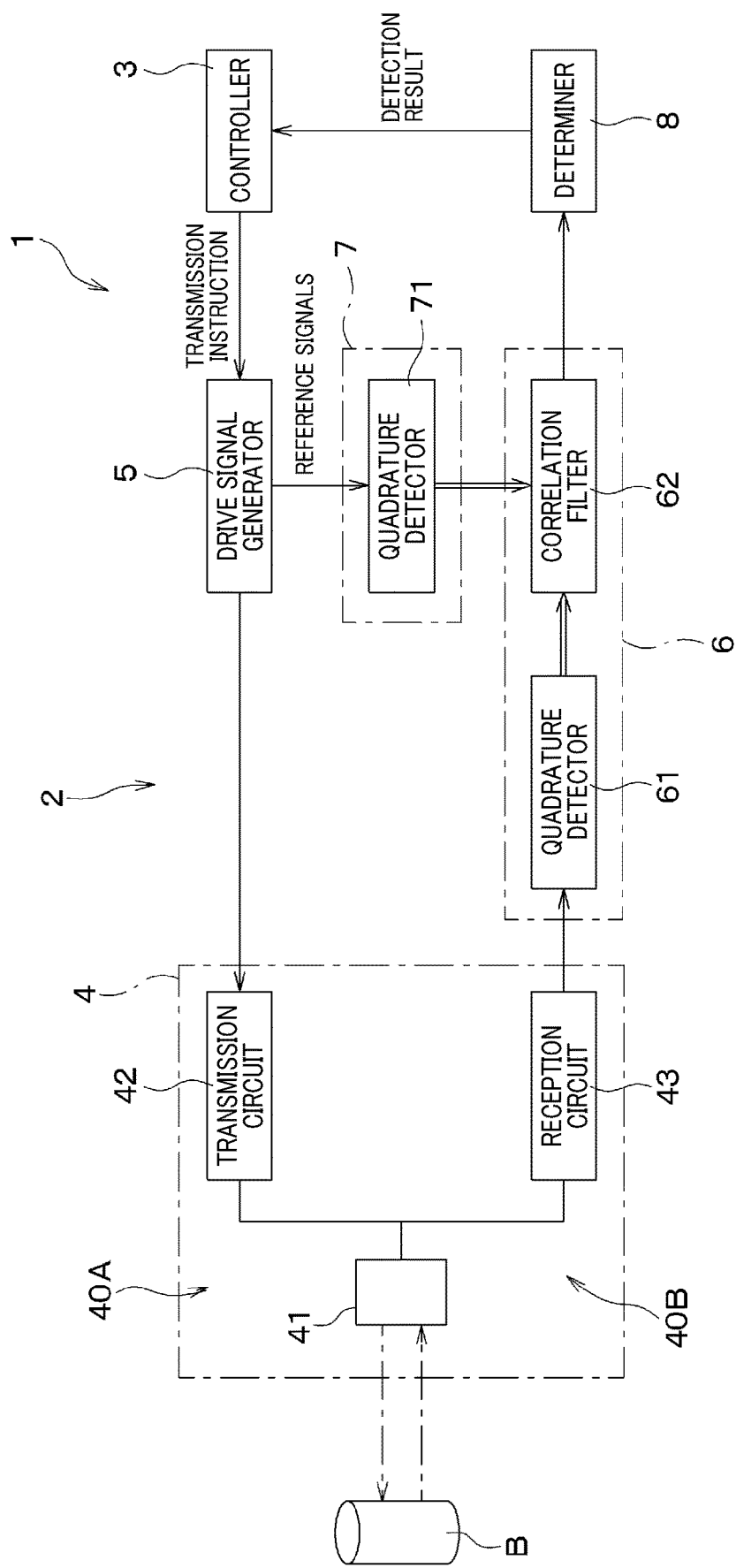
FIG. 1 is a block diagram of an object detection device according to a first embodiment.

The above known technique, as disclosed in JP 1988-249071 A, needs a large amount of calculation for correlation detection between the received and reference signals. Thus, an object detection device that uses such correlation detection is prone to have an increased circuit size.

In view of the foregoing, it is desired to have an object detection device capable of reducing the amount of calculation for correlation detection.

According to one aspect of the present embodiment, an object detection device includes a transceiver that transmits ultrasonic waves encoded with frequency modulation and receives an ultrasonic wave and outputs a reception signal, a first quadrature detector that generates and outputs a complex reception signal based on quadrature detection of the reception signal, a second quadrature detector that generates and outputs a complex reference signal based on quadrature detection of the reference signal, a correlation filter that performs correlation detection between the complex reception signal and the complex reference signal and outputs a correlation signal, and a code determiner that determines a code included in the reception signal based on the correlation signal.

In this manner, converting the reception signal and the reference signal into complex signals based on quadrature detection allows a correlation between them to be calculated using vector and matrix operations, thereby reducing the amount of calculation for correlation detection.

Hereinafter, some embodiments of the disclosure will be described with reference to the drawings. In order to facilitate understanding of the description, the same structural elements in the drawings share the same reference numerals, and repeated description is omitted.

First Embodiment

A first embodiment will now be described. An object detection device 1 of the present embodiment illustrated in FIG. 1 is mounted to a vehicle which is not shown in the figure, and is configured to detect an object B around the vehicle. The vehicle carrying the object detection device 1 is hereinafter referred to as an "own vehicle". The vehicle (not shown) is, for example, an automobile.

The object detection device 1 includes an ultrasonic sensor 2 and a controller 3 that controls the operation of the ultrasonic sensor 2. The ultrasonic sensor 2 is configured to detect an object B by transmitting probe waves which are ultrasonic waves, and receiving reflected waves of the probe waves by the object B.

The ultrasonic sensor 2 includes a transceiver 4, a drive signal generator 5, a matched filter 6, a reference signal processor 7, and a determiner 8. The transceiver 4 includes a transmission section 40A and a reception section 40B. The transmission section 40A is provided to enable transmission of probe waves to the outside. The reception section 40B is provided to receive ultrasonic waves, including reflected waves by the object B, of the probe waves transmitted from the transmission section 40A.

The transceiver 4 includes a transducer 41, a transmission circuit 42, and a reception circuit 43. The transmitter section 40A is formed of the transducer 41 and the transmission circuit 42. The reception section 40B is formed of the transducer 41 and the reception circuit 43.

The transducer 41 serves as a transmitter to transmit the probe waves to the outside and as a receiver to receive the reflected waves, and is electrically connected to the transmission circuit 42 and the reception circuit 43. That is, the ultrasonic sensor 2 has a so-called integrated transmitter/receiver configuration.

Specifically, the transducer 41 is configured as an ultrasonic microphone with a built-in electrical-mechanical energy conversion element, such as a piezoelectric element. The transducer 41 is disposed in a position facing the outer surface of the own vehicle so as to be capable of transmitting probe waves to the outside of the own vehicle and receiving reflected waves from the outside of the own vehicle.

The transmission circuit 42 is provided to drive the transducer 41 based on the drive signal received, thereby causing the transducer 41 to transmit a probe wave. Specifically, the transmission circuit 42 includes a digital-to-analog conversion circuit and the like. That is, the transmission circuit 42 is configured to generate an element input signal by performing signal processing such as digital-to-analog conversion on the drive signal output from the drive signal generator 5. The element input signal is an AC voltage signal to drive the transducer 41. The transmission circuit 42 is configured to apply the generated element input signal to the transducer 41 to excite the electrical-mechanical energy conversion element in the transducer 41, thereby generating a probe wave.

The reception circuit 43 is configured to generate a reception signal corresponding to a result of reception of an ultrasonic wave by the transducer 41 and output the reception signal to the matched filter 6. Specifically, the reception circuit 43 includes an amplification circuit and an analog-to-digital conversion circuit. That is, the reception circuit 43 is configured to perform signal processing, such as amplification and analog-to-digital conversion and the like, on an element output signal output from the transducer 41 to generate a reception signal that includes information about the amplitude and frequency of the received wave. The element output signal is an alternating voltage signal generated by the electrical-mechanical energy conversion element in the transducer 41 through reception of the ultrasonic wave.

As described later, the probe wave includes an ultrasonic wave encoded by frequency modulation. The center frequency of the frequency modulation band of the probe wave is fc, and the sampling frequency of the reception circuit 43 is at least twice fc. The sampling frequency of the reception signal may be the same as or different from the sampling frequency of the drive signal.

The drive signal generator 5 is configured to generate a drive signal and output it to the transmission circuit 42. The drive signal is a signal for driving the transducer 41 to cause the transducer 41 to transmit a probe wave.

The drive signal generator 5 is configured to generate a drive signal corresponding to a frequency modulation state of the probe wave among predefined frequency modulation states. The drive signal generator 5 generates the drive signal such that the frequency of the probe wave is swept in a range including a resonant frequency of the transducer 41.

In the present embodiment, the predefined frequency modulation states include an up-chirp or down-chirp. The up-chirp is a frequency modulation state such that the frequency increases monotonically with time. The down-chirp is a frequency modulation state such that the frequency decreases monotonically with time.

The drive signal generator 5, the matched filter 6, the reference signal processor 7, and the determiner 8 may be configured, for example, as a Digital Signal Processor (DSP) having functions programmed, such as the above-described drive signal generation, as well as quadrature detection, correlation detection, code determination, object detection determination, and the like as described later.

Figure 2:
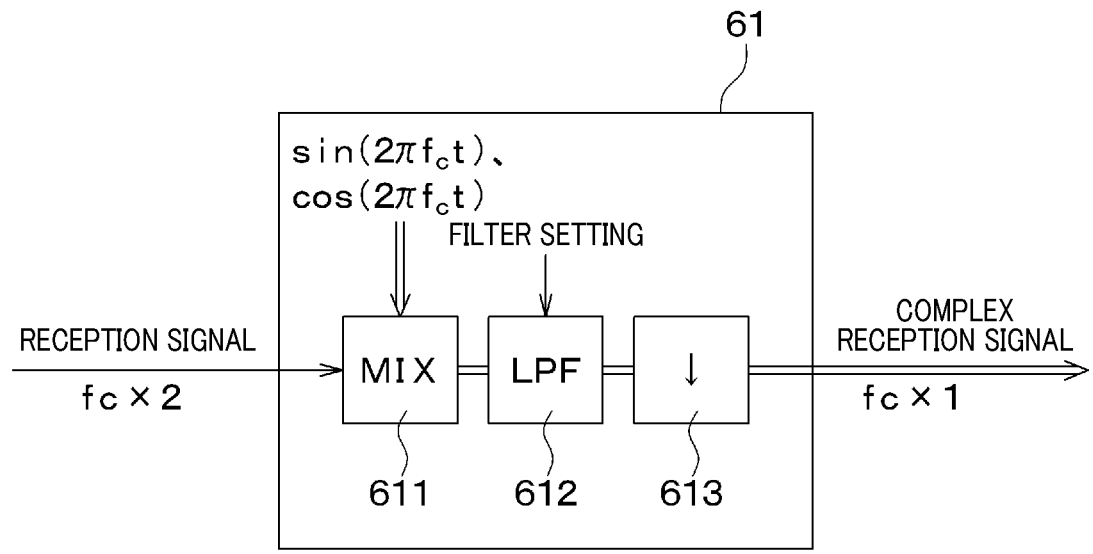
FIG. 2 is a block diagram of a quadrature detector included in a matched filter illustrated in FIG. 1.

The matched filter 6 processes the reception signal and performs correlation detection between the reception signal and a reference signal. The matched filter 6 includes a quadrature detector 61 and a correlation filter 62. The quadrature detector 61, which corresponds to a first quadrature detector, generates a complex signal based on quadrature detection of the reception signal output from the reception circuit 43. As illustrated in FIG. 2, the quadrature detector 61 includes a multiplier 611, a low-pass filter (LPF) 612, and a down-sampler 613.

The multiplier 611 multiplies the reception signal output from the reception circuit 43 by $\sin(2\pi fct)$ and $\cos(2\pi fct)$ to generate a complex signal. Here, t is time. The signals $\sin(2\pi fct)$ and $\cos(2\pi fct)$ are input from the drive signal generator 5 to the multiplier 611. The multiplier 611 outputs the generated complex signal to the LPF 612.

The LPF 612 removes high frequency components from the complex signal output from the multiplier 611. The cut-off frequency of the LPF 612 is received from the controller 3 and is set based on the bandwidth of the transducer 41 and the sweep band of the drive signals. The complex signal having the high-frequency components removed by the LPF 612 is input to the down-sampler 613.

The down-sampler 613 down-samples the output signal from the LPF 612. The down-sampler 613, for example, down-samples the signal sampled at twice the center frequency fc to one times the center frequency fc. The sampling frequency after down-sampling may be set lower than one times the center frequency fc according to the cut-off frequency of the LPF 612. Since the high frequency components have been removed by the LPF 612, the reception signal can be down-sampled, which can reduce an amount of calculation by the correlation filter 62, thereby reducing the circuit area.

In a configuration where the object detection device 1 includes a plurality of identical transceivers 4 and discriminates between a direct wave which occurs in the case of the transceiver 4 on the transmission side and the transceiver 4 on the reception side being the same, and an indirect wave which occurs in the case of the transceiver 4 on the transmission side and the transceiver 4 on the reception side being different, correlation calculations are required for both up- and down-chirps.

For example, in a case where one of two transceivers 4 transmits an up-chirp signal and the other transmits a down-chirp signal, a correlation calculation between the reception signal received at each of the two transceivers 4 and each of the two chirp signals is made. If the correlation between the reception signal at one of the transceiver units 4 that transmitted the up-chirp signal and the up-chirp signal is high, the ultrasonic wave received by this transceiver unit 4 is determined to be a direct wave. If the correlation with the down-chirp signal is high, this ultrasonic wave is determined to be an indirect wave. If the correlation between the reception signal at the other transceiver unit 4 that transmitted the down-chirp signal and the down-chirp signal is high, the ultrasonic wave received by this transceiver unit 4 is determined to be a direct wave. If the correlation with the up-chirp signal is high, this ultrasonic wave is determined to be an indirect wave.

Making multiple correlation calculations in this manner increases the amount of calculation, leading to an increased circuit size of the object detection device 1. In contrast, down-sampling as described above can reduce the amount of calculation, leading to a reduced circuit size. The output signal of the down-sampler 613 is input to the correlation filter 62.

The complex signal output from the down-sampler 613 is a complex reception signal. The complex reception signal consists of N signals sampled by the down-sampler 613. N is an integer greater than or equal to 2. The N signals forming the complex reception signal are denoted as signals $S_1$ to $S_N$ in the order in which they were sampled.

The correlation filter 62 performs correlation detection between the complex reception signal generated by the quadrature detector 61 and each of the reference signals corresponding to the up-chirp and down-chirp, respectively, and outputs a correlation signal. The correlation signal output from the correlation filter 62 is input to the determiner 8. Details of the correlation filter 62 will be described later.

The reference signal processor 7 processes signals output from the drive signal generator and outputs them to the matched filter 6. The signals output from the drive signal generator 5 to the reference signal processor 7 correspond to the up-chirp and down-chirp used for the drive signal to be input to the transceiver 4, where these signals are reference signals for identifying the code of the reception signal. The drive signal generator 5 outputs the reference signal corresponding to the up-chirp and the reference signal corresponding to the down-chirp to the reference signal processor 7. In the matched filter 6, the reference signals processed by the reference signal processor 7 are used for correlation detection. As illustrated in FIG. 1, the reference signal processor 7 includes a quadrature detector 71.

Figure 3:
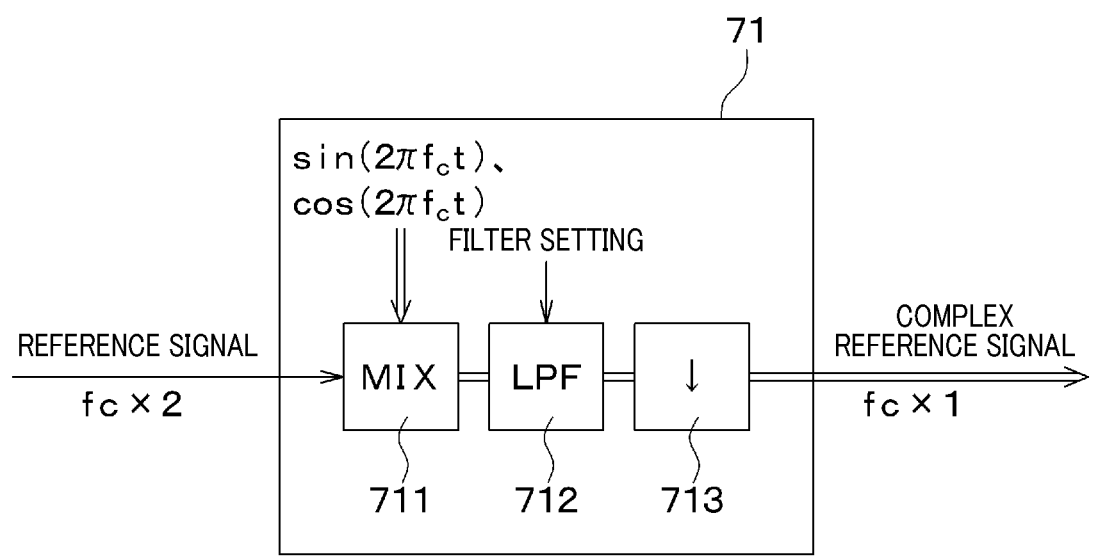
FIG. 3 is a block diagram of a quadrature detector included in a reference signal processor illustrated in FIG. 1.

The quadrature detector 71 generates a complex signal based on quadrature detection of the reference signal output from the drive signal generator 5, and corresponds to a second quadrature detector. As illustrated in FIG. 3, the quadrature detector 71 includes a multiplier 711, an LPF 712, and a down-sampler 713. The multiplier 711, the LPF 712, and the down-sampler 713 have the same configuration as the multiplier 611, LPF 612, and down-sampler 613 of the quadrature detector 61.

That is, the multiplier 711 multiplies the reference signal by each of $\sin(2\pi fct)$ and $\cos(2\pi fct)$ to generate a complex signal, and the LPF 712 removes high-frequency components from the complex signal output from the multiplier 711. The down-sampler 713 down-samples the output signal of the LPF 712.

The down-sampler 713 performs down-sampling such that the sampling frequency after down-sampling for the reference signal is the same as the sampling frequency after down-sampling for the reception signal. That is, for example, if the input signal is down-sampled at one times the center frequency fc in the down-sampler 613, the input signal is also down-sampled at one times the center frequency fc in the down-sampler 713. Since this down-sampling performed is after the high-frequency components have been removed by LPF 712, the reference signal can be down-sampled, which can reduce the amount of calculation for the correlation filter 62 and thus the circuit area can be reduced. The output signal of the down-sampler 713 is then input to the correlation filter 62.

The complex signal output from the down-sampler 713 is a complex reference signal. The complex reference signal consists of N signals like the complex reception signal. The N signals forming the complex reference signal are the signals $S_{R1}$ to $S_{RN}$ in the order in which they are sampled. In the correlation filter 62, correlation detection is performed between the complex reception signal, which consists of signals $S_1$ to $S_N$, and the complex reference signal, which consists of signals $S_{R1}$ to $S_{RN}$.

Figure 4:
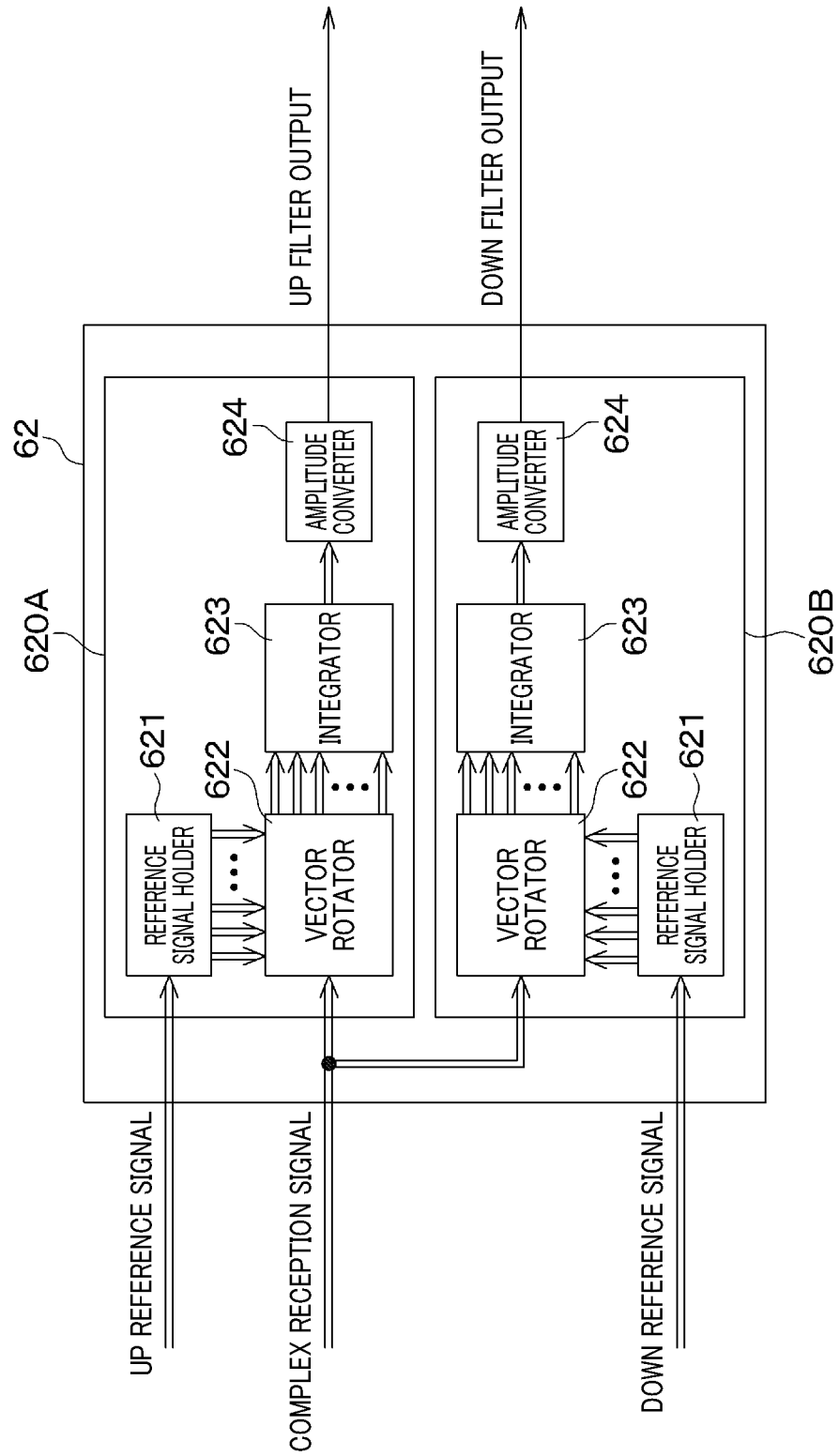
FIG. 4 is a block diagram of a correlation filter illustrated in FIG. 1.

As illustrated in FIG. 4, the correlation filter 62 includes an up-chirp filter 620A and a down-chirp filter 620B. The up-chirp filter 620A performs correlation detection between the complex reception signal and the complex reference signal for the up-chirp signal. The down-chirp filter 620B performs correlation detection between the complex reception signal and the complex reference signal for the down-chirp signal.

The up-chirp filter 620A includes a reference signal holder 621, a vector rotator 622, an integrator 623, and an amplitude converter 624.

Figure 5:
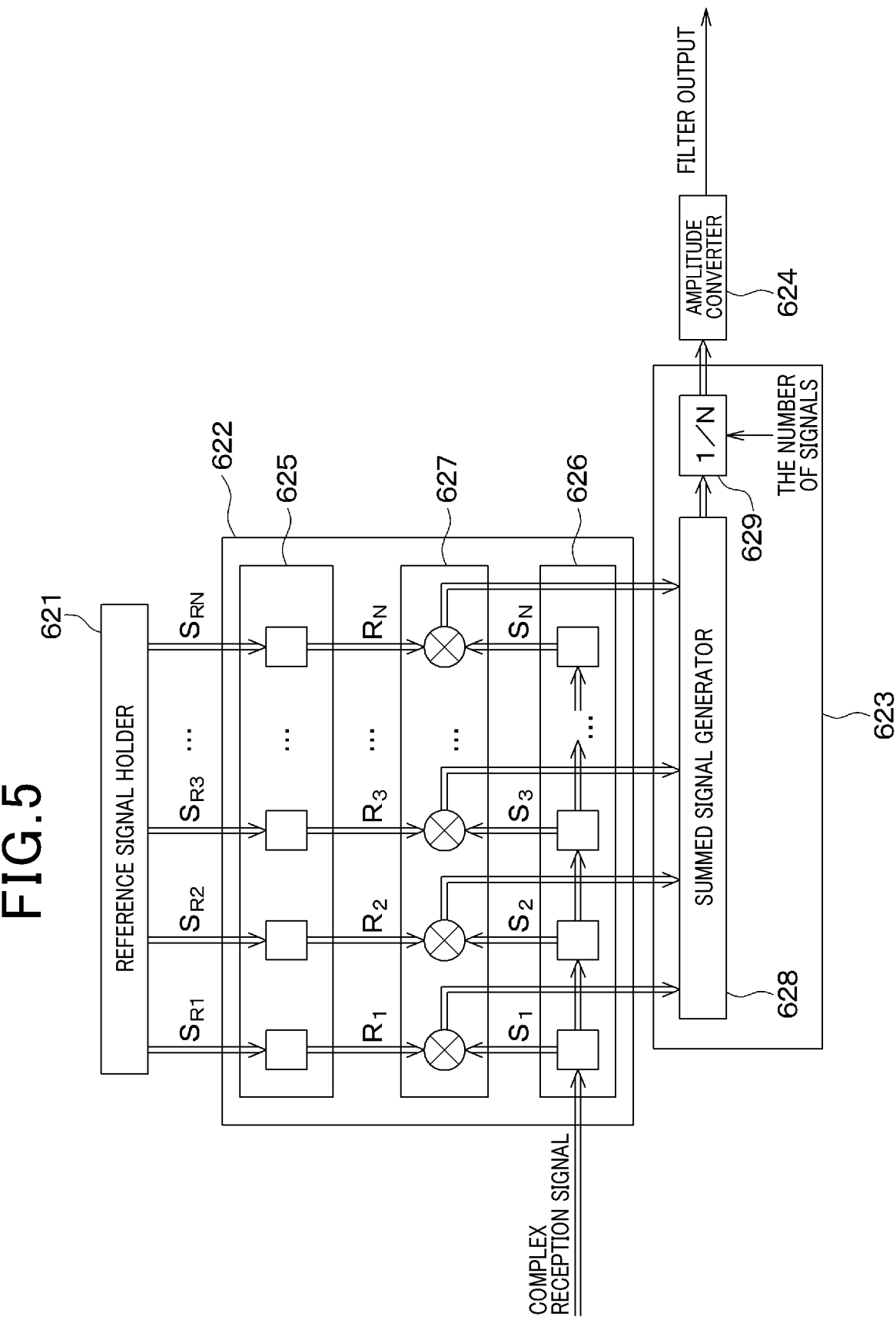
FIG. 5 is a block diagram of a vector rotator and an integrator illustrated in FIG. 4.

The up-chirp filter 620A is configured to receive from the reference signal processor 7 the complex reference signal generated through quadrature detection of the reference signal corresponding to the up-chirp. The reference signal holder 621 is configured to hold and output the complex reference signal received from the reference signal processor 7, and output the plurality of signals forming the complex reference signal individually. Specifically, the reference signal holder 621 outputs the signals $S_{R1}$ to $S_{RN}$ output from the down-sampler 713 individually. The vector rotator 622 performs vector rotation of the received signal. As illustrated in FIG. 5, the vector rotator 622 includes a matrix converter 625, a reception signal holder 626, and a multiplier 627.

The matrix converter 625 converts the signals $S_{R1}$ to $S_{RN}$ output from the reference signal holder 621 into rotation matrices $R_1$ to $R_N$. Specifically, with the phase of signal $S_{R1}$ as $\theta_{R1}$, the rotation matrix $R_1$ is generated as follows.

$$R_1 = \begin{bmatrix} \cos\theta_{R1} & \sin\theta_{R1} \\ -\sin\theta_{R1} & \cos\theta_{R1} \end{bmatrix}$$

The rotation matrices $R_2$ to $R_N$ are generated in the same way using the phases $\theta_{R2}$ to $\theta_{RN}$ of the signals $S_{R2}$ to $S_{RN}$. The matrix converter 625 outputs the signals corresponding to the generated rotation matrices $R_1$ to $R_N$ individually to the multiplication unit 627.

The reception signal holder 626 holds the complex reception signal and outputs it to the multiplier 627. The reception signal holder 626 is configured to receive the complex reception signal from the quadrature detector 61, and the reception signal holder 626 outputs the received signals $S_1$ to $S_N$ individually to the multiplier 627.

Figure 6:
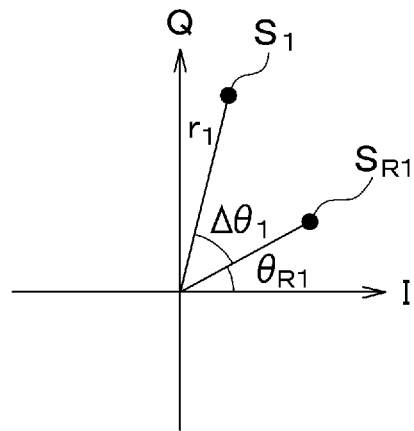
FIG. 6 is an illustration of a phase difference between a complex reception signal and a complex reference signal.
Figure 7:
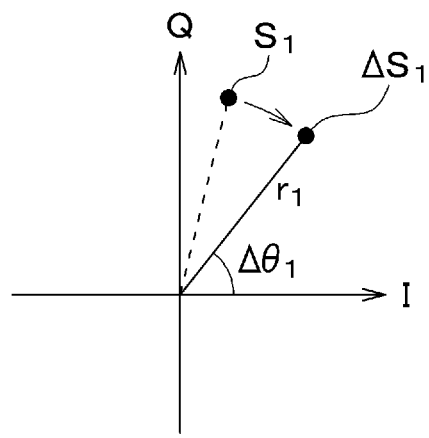
FIG. 7 is an illustration of vector rotation of a complex reception signal.

The multiplier 627 multiplies the rotation matrices $R_1$ to $R_N$ generated by the matrix converter 625 by the vectors of the signals $S_1$ to $S_N$ to generate signals $\Delta S_1$ to $\Delta S_N$ whose phase is the phase difference between the reception signal and the reference signal. For example, as illustrated in FIG. 6, with the phase difference between signal $S_1$ and signal $S_{R1}$ denoted by $\Delta\theta_1$ and the amplitude of signal $S_1$ denoted by $r_1$, the phase of signal $\Delta S_1$ is $\Delta\theta_1$ and the amplitude is $r_1$, as illustrated in FIG. 7. FIGS. 6 and 7, as well as FIGS. 8 through 11, FIGS. 18 and 19 described later, show the signal $S_1$, etc., on the complex plane. With the real part of the signal $S_1$ denoted by $I_1$ and the imaginary part denoted by $Q_1$, and the real part of the signal $\Delta S_1$ denoted by $I_1'$ and the imaginary part denoted by $Q_1'$, $I_1'$ and $Q_1'$ can be obtained according to the following relational expression.

$$\begin{bmatrix} I_1' \\ Q_1' \end{bmatrix} = R_1 \begin{bmatrix} I_1 \\ Q_1 \end{bmatrix}$$

Similarly, with phase differences between the signals $S_2$ and $S_{R2}$, between the signals $S_3$ and $S_{R3}$, ..., and between the signals $S_N$ and $S_{RN}$ denoted by $\Delta\theta_2$ to $\Delta\theta_N$, the amplitudes of the signals $S_2$ to $S_N$ are $r_2$ to $r_N$. From real parts $I_2$ to $I_N$, imaginary parts $Q_2$ to $Q_N$, and rotation matrices $R_2$ to $R_N$ of the signals $S_2$ to $S_N$, the real parts $I_2'$ to $I_N'$ and imaginary parts $Q_2'$ to $Q_N'$ of the signals $\Delta S_2$ to $\Delta S_N$ are calculated. The multiplier 627 outputs the signals $\Delta S_1$ to $\Delta S_N$ individually to the integrator 623.

As illustrated in FIG. 5, the integrator 623 includes a summed signal generator 628 and an averager 629. The signals $\Delta S_1$ to $\Delta S_N$ output from the multiplier 627 are input to the summed signal generator 628. The summed signal generator 628 sums the reception signals, thereby performing correlation detection between the reception signal and the reference signal.

Figure 8:
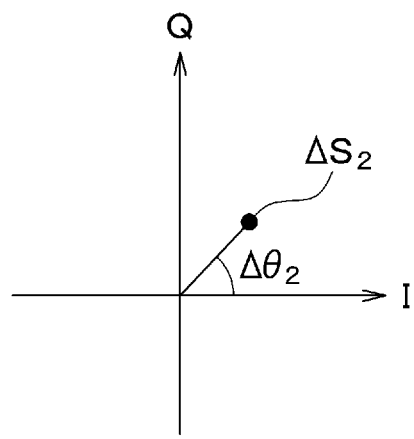
FIG. 8 is an illustration of a vector-rotated signal.
Figure 9:
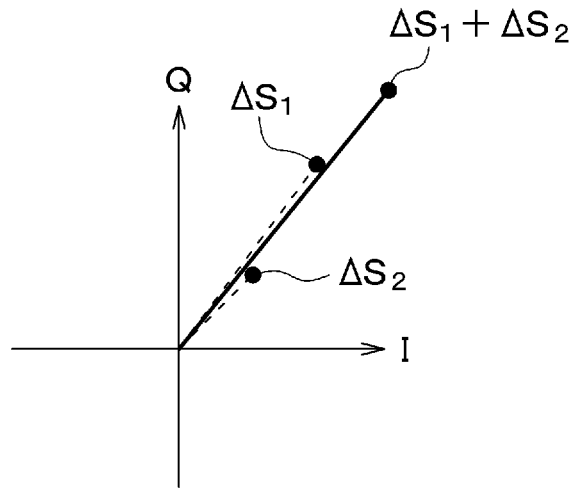
FIG. 9 is an illustration of a result of addition of vector-rotated signals.
Figure 10:
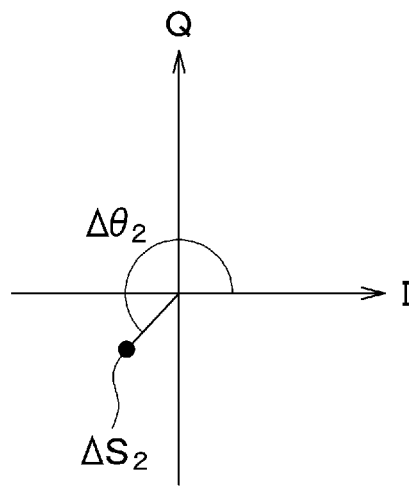
FIG. 10 is an illustration of a vector-rotated signal.
Figure 11:
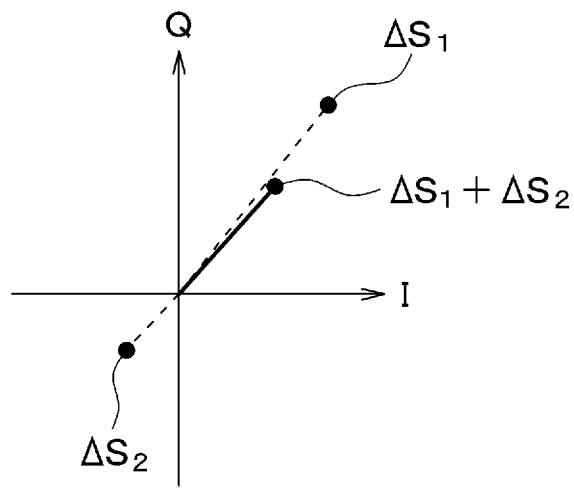
FIG. 11 is an illustration of a result of addition of vector-rotated signals.

When the signals $\Delta S_1$ to $\Delta S_N$ are summed, the amplitude increases when the correlation between the reception signal and the reference signal is high, and decreases when the correlation is low. For example, as illustrated in FIG. 7 and FIG. 8, in a case where the phases $\Delta\theta_1$ and $\Delta\theta_2$ of the signals $\Delta S_1$ and $\Delta S_2$ are equal to each other, the amplitude increases when the signal $\Delta S_2$ is added to the signal $\Delta S_1$, as illustrated in FIG. 9. On the other hand, as illustrated in FIG. 10, in a case where the phase $\Delta\theta_2$ of the signal $\Delta S_2$ is significantly different from the phase $\Delta\theta_1$ of the signal $\Delta S_1$, the amplitude decreases when the signal $\Delta S_2$ is added to the signal $\Delta S_1$, as illustrated in FIG. 11.

Summing the signals $\Delta S_1$ to $\Delta S_N$ allows the amplitude of the complex signal generated by the summed signals to represent the level of the correlation between the reception signal and the reference signal. The summed signal generator 628 outputs the complex signal generated by summation of the signals $\Delta S_1$ to $\Delta S_N$ to the averager 629.

The averager 629 generates an averaged complex signal by dividing the amplitude of the output signal from the summed signal generator 628 by N. The complex signal averaged by the averager 629 is output to the amplitude converter 624.

In an alternative embodiment, the integrator 623 may be configured to sum only the signals included in a range set by a predefined condition among the signals $\Delta S_1$ to $\Delta S_N$. For example, since the components at both ends of the frequency band in the reception signal have low S/N, setting the summation range such that the corresponding portions are excluded from the reference signal improves the accuracy of code determination.

The amplitude converter 624 converts the complex signal received from the averager 629 into an amplitude signal. Specifically, the amplitude converter 624 calculates the absolute value from the real and imaginary parts of this complex signal and outputs this absolute value as an amplitude. The amplitude signal generated by the amplitude converter 624 is output to the determiner 8 as a correlation signal.

As illustrated in FIG. 4, the down-chirp filter 620B, like the up-chirp filter 620A, includes the reference signal holder 621, the vector rotator 622, the integrator 623, and the amplitude converter 624. The reference signal holder 621 through the amplitude converter 624 of the down-chirp filter 620B are configured similarly to the reference signal holder 621 through the amplitude converter 624 of the up-chirp filter 620A. In the down-chirp filter 620B, a complex reference signal generated through quadrature detection of the reference signal corresponding to the down-chirp is input from the reference signal processor 7 to the reference signal holder 621, and correlation detection is performed between the complex reception signal and this complex reference signal. The amplitude signal generated by the amplitude converter 624 is output to the determiner 8 as a correlation signal.

The determiner 8 determines the code included in the reception signal based on the correlation signals output from the matched filter 6. The determiner 8 corresponds to a code determiner. The determiner 8 makes an object detection determination based on the reception signal and a result of code determination. The determiner 8 calculates peaks of the up-chirp correlation signal and the down-chirp correlation signal based on the correlation outputs of the up-chirp filter 620A and the down-chirp filter 620B. The determiner 8 compares these peaks to determine that the code corresponding to the correlation signal with the larger peak is included in the reception signal, thereby making an object detection determination. The determiner 8 transmits the result of object detection determination to the controller 3.

The controller 3 is connected to the ultrasonic sensor 2 via an on-board communication line to enable information communication, and is configured to control the transmit and receive operations of the ultrasonic sensor 2. The controller 3 is provided as a so-called sonar ECU and includes an on-board microcomputer formed of a CPU, a ROM, a RAM, a non-volatile rewritable memory, and other components, which are not shown in the figure. The ECU is an abbreviation for Electronic Control Unit. The non-volatile rewritable memory is, for example, an EEPROM, a Flash ROM or the like. EEPROM is an abbreviation for Electronically Erasable and Programmable Read Only Memory. The ROM, RAM and the like are non-transitory tangible storage media.

The operation of the object detection device 1 will now be described. The object detection device 1 repeatedly performs the object detection process, including the process illustrated in FIG. 12. In the object detection process, first, a transmission instruction is issued from the controller 3 to the drive signal generator 5, and a probe wave is transmitted from the transducer 41 based on the drive signal generated by the drive signal generator 5. Upon detection of reception of the ultrasonic signal by the transceiver 4, the object detection device 1 performs the process illustrated in FIG. 12 to detect an object.

First, at step S101, the quadrature detector 61 quadrature detects the reception signal output from the transceiver 4 to generate a complex reception signal and outputs it to the correlation filter 62. The quadrature detector 71 quadrature detects the reference signals corresponding to respective ones of the up-chirp and the down-chirp output from the driving signal generator 5, generates complex reference signals, and outputs the complex reference signals to the correlation filter 62.

Subsequently, at step S102, the correlation filter 62 performs correlation detection between the complex reception signal output from the quadrature detector 61 and the complex reference signal corresponding to the up-chirp, and outputs a correlation signal to the determiner 8. The correlation filter 62 performs correlation detection between the complex reception signal and the complex reference signal corresponding to the down-chirp, and outputs a correlation signal to the determiner 8.

Subsequently, at step S103, the determiner 8 determines whether the peak of the correlation signal for the up-chirp output from the correlation filter 62 is greater than the peak of the correlation signal for the down-chirp. If the peak of the correlation signal for the up-chirp is greater than the peak of the correlation signal for the down-chirp, the determiner 8 stores the result of code determination that the reception signal includes the up-chirp, and makes an object detection determination based on this result at step S104. If the peak of the correlation signal for the up-chirp is less than or equal to the peak of the correlation signal for the down-chirp, the determiner 8 stores the result of code determination that the reception signal includes the down-chirp, and makes an object detection determination based on this result.

For example, the determiner 8 calculates a distance to the object based on a length of time from transmission of the probe wave to when the amplitude of the reception signal whose code matches that of the transmission signal becomes greater than or equal to a predefined value, and transmits a result of calculation to the controller 3. Based on the result of calculation of the distance and the speed of the own vehicle and the like, the controller 3 determines whether a possibility of colliding with the object is high. According to the result of determination, avoidance control or braking control is performed. After completion of step S104 or S105, the object detection unit 1 terminates the process.

Advantages of the present embodiment will be described. As described above, in the present embodiment, the reception signal and the reference signals are converted into complex signals through quadrature detection, and the code included in the reception signal is determined by correlation detection between the complex reception signal and each of the complex reference signals. Converting the reception signal and the reference signals into complex signals in this manner allows for correlation calculation by vector and matrix operations and down-sampling, which can reduce the amount of calculation in the correlation filter 62 and thus reduce the circuit area.

Second Embodiment

A second embodiment will now be described. This embodiment is different from the first embodiment in that a configuration for normalizing the complex signals is added, and the other parts are similar to those of the first embodiment. Therefore, only the differences from the first embodiment will be described.

Figure 13:
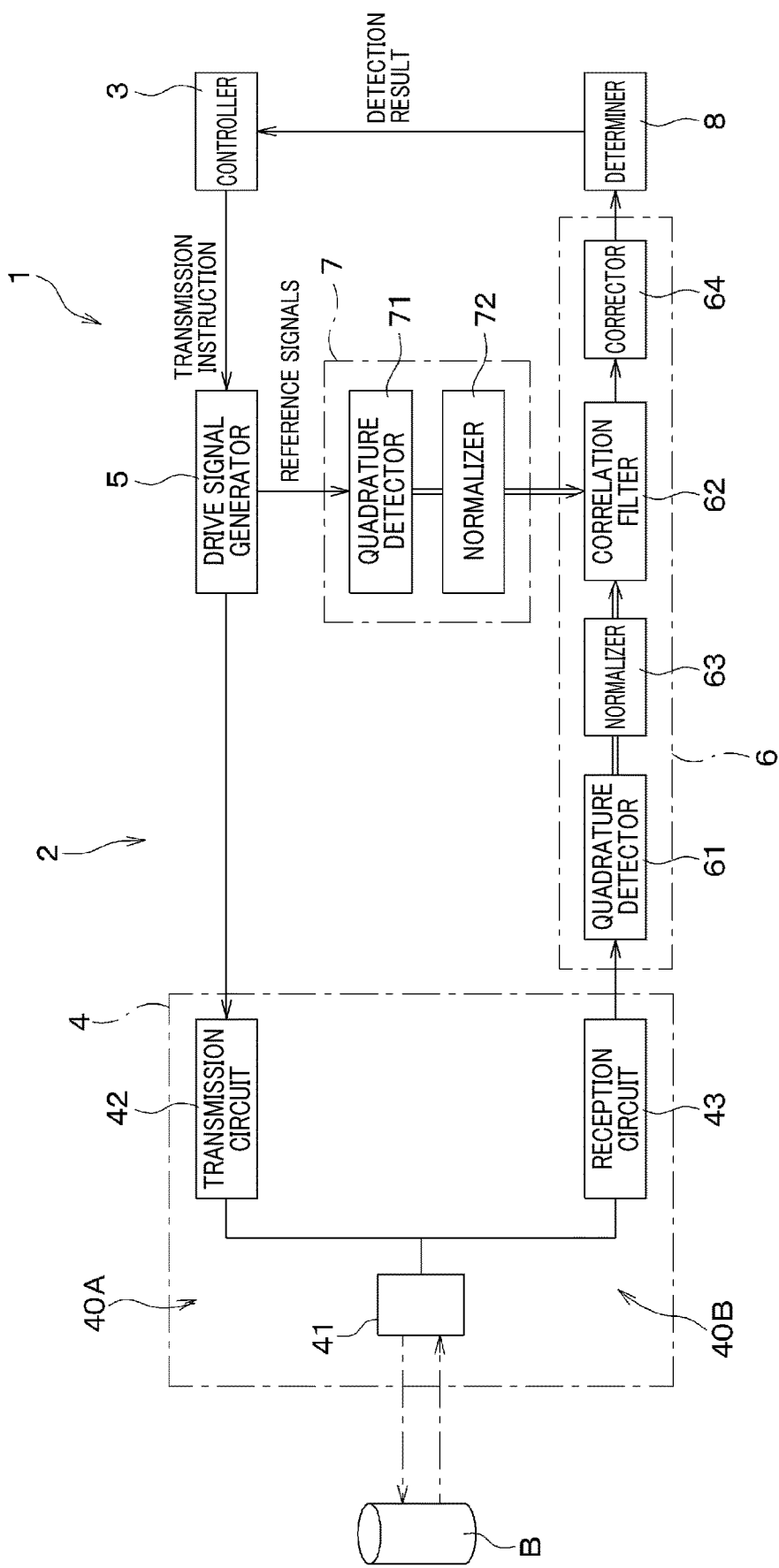
FIG. 13 is a block diagram of an object detection device according to a second embodiment.

As illustrated in FIG. 13, the matched filter 6 of the present embodiment includes a normalizer 63 and a corrector 64, in addition to the quadrature detector 61 and the correlation filter 62. The reference signal processor 7 includes a normalizer 72 in addition to the quadrature detector 71. The drive signal generator 5, the matched filter 6, the reference signal processor 7, and the determiner 8 are configured, for example, as a DSP having the functions programmed, such as the above-described drive signal generation, quadrature detection, correlation detection, code determination, object detection determination, and normalization, delay correction, amplitude correction and the like as described later.

Figure 14:
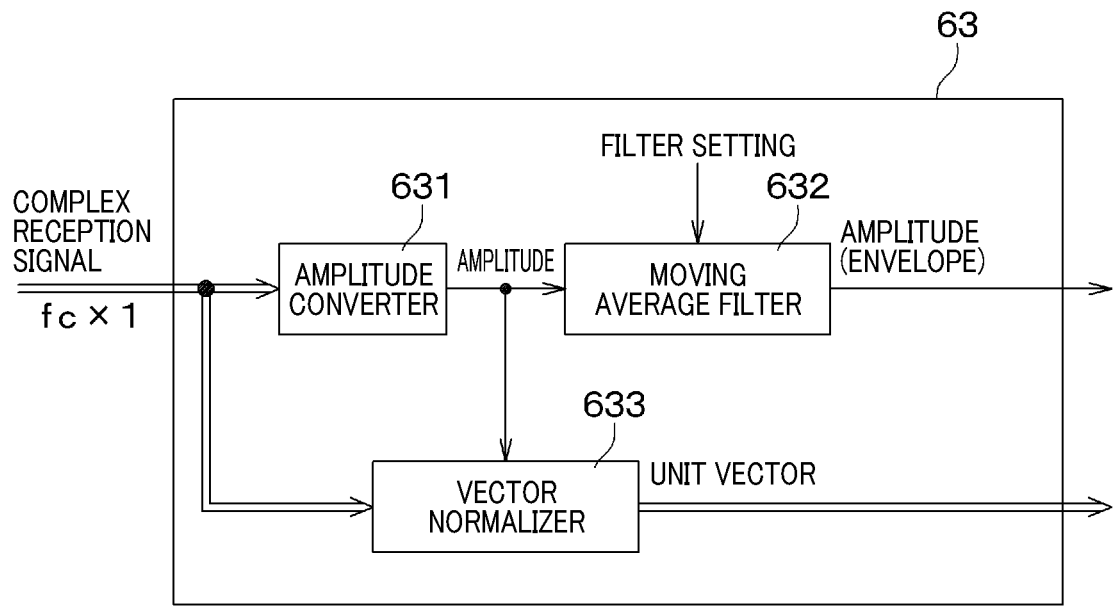
FIG. 14 is a block diagram of a normalizer included in a matched filter illustrated in FIG. 13.

The normalizer 63 normalizes the complex reception signal output from the quadrature detector 61 such that the amplitude of the complex reception signal is constant. The normalizer 63 corresponds to a second normalizer. As illustrated in FIG. 14, the normalizer 63 includes an amplitude converter 631, a moving average filter 632, and a vector normalizer 633. The complex reception signal output from quadrature detector 61 is input to the amplitude converter 631 and to the vector normalizer 633.

The amplitude converter 631 converts the complex reception signal output from the quadrature detector 61 into an amplitude. The amplitude converter 631 calculates the amplitudes $r_1$ to $r_N$ from the real parts $I_1$ to $I_N$ and the imaginary parts $Q_1$ to $Q_N$ for the signals $S_1$ to $S_N$. That is, the amplitude $r_1$ is calculated as $r_1 = \sqrt{I_1^2 + Q_1^2}$, and the amplitudes $r_2$ to $r_N$ are calculated in the same manner. The result of amplitude calculation by the amplitude converter 631 is input to the moving average filter 632 and the vector normalizer 633.

The moving average filter 632 calculates a moving average of the amplitudes $r_1$ to $r_N$ and generates an envelope of the amplitude of the complex reception signal. The settings of the moving average filter 632 are received from the controller 3. The envelope of the amplitude of the complex reception signal generated by the moving average filter 632 is output to the corrector 64 and to the determiner 8. In the present embodiment, the normalizer 63 includes the moving average filter 632. Alternatively, the normalizer 63 may include an LPF instead of the moving average filter 632. In addition, the normalizer 63 may not include the moving average filter 632, and the output of the amplitude converter 631 may be output directly to the corrector 64 and to the determiner 8.

The vector normalizer 633 converts, based on the amplitudes $r_1$ to $r_N$ input from the amplitude converter unit 631, the complex reception signal received from the quadrature detector unit 61 into a unit vector by normalizing the amplitude while leaving the phase unchanged. Specifically, the vector normalizer 633 divides the complex reception signal by its original amplitude. That is, the real parts $I_1$ to $I_N$ of the signals $S_1$ to $S_N$ are converted to $I_1/r_1$ to $I_N/r_N$, and the imaginary parts $Q_1$ to $Q_N$ of the signals $S_1$ to $S_N$ are converted to $Q_1/r_1$ to $Q_N/r_N$. In the present embodiment, the normalized signals $S_1$ to $S_N$ are input to the correlation filter 62. In the multiplier 627 of the vector rotator 622, $I_1/r_1$ to $I_N/r_N$ and $Q_1/r_1$ to $Q_N/r_N$ are used instead of $I_1$ to $I_N$ and $Q_1$ to $Q_N$ to perform the operations according to the relational expression 2.

As described in the present embodiment, the case in which the complex reception signal is normalized such that the amplitude is one has been described. Alternatively, the amplitude of the complex reception signal may be normalized to a value different from one. As described later, in the present embodiment, each complex reference signal is normalized such that the amplitude is one. Alternatively, the amplitude of each complex reference signal may be normalized to a value different from one.

Thus, in the present embodiment, the complex reception signal is normalized by the normalizer 63. The normalized complex reception signal is input to the correlation filter 62, where correlation detection with each of the complex reference signals is performed. The correlation filter 62 of the present embodiment outputs the correlation signals to the corrector 64.

The normalizer 72 normalizes each of the complex reference signals output from the quadrature detector 71 such that the amplitude is constant. The normalizer 72 corresponds to a first normalizer. The normalizer 72 has the same configuration as the amplitude converter 631 and the vector normalizer 633 of the normalizer 63. The complex reference signal normalized by the normalizer 72 to have an amplitude of one is output to the correlation filter 62. Specifically, the up-chirp filter 620A of the correlation filter 62 receives the normalized signals $S_{R1}$-$S_{RN}$ corresponding to the up-chirp from the normalizer 72. The down-chirp filter 620B of the correlation filter 62 receives the normalized signals $S_{R1}$-$S_{RN}$ corresponding to the down-chirp from the normalizer 72. In each of the up-chirp filter 620A and the down-chirp filter 620B, correlation detection is performed between the normalized complex reception signal and the normalized complex reference signal, and the correlation signal is output.

Figure 15:
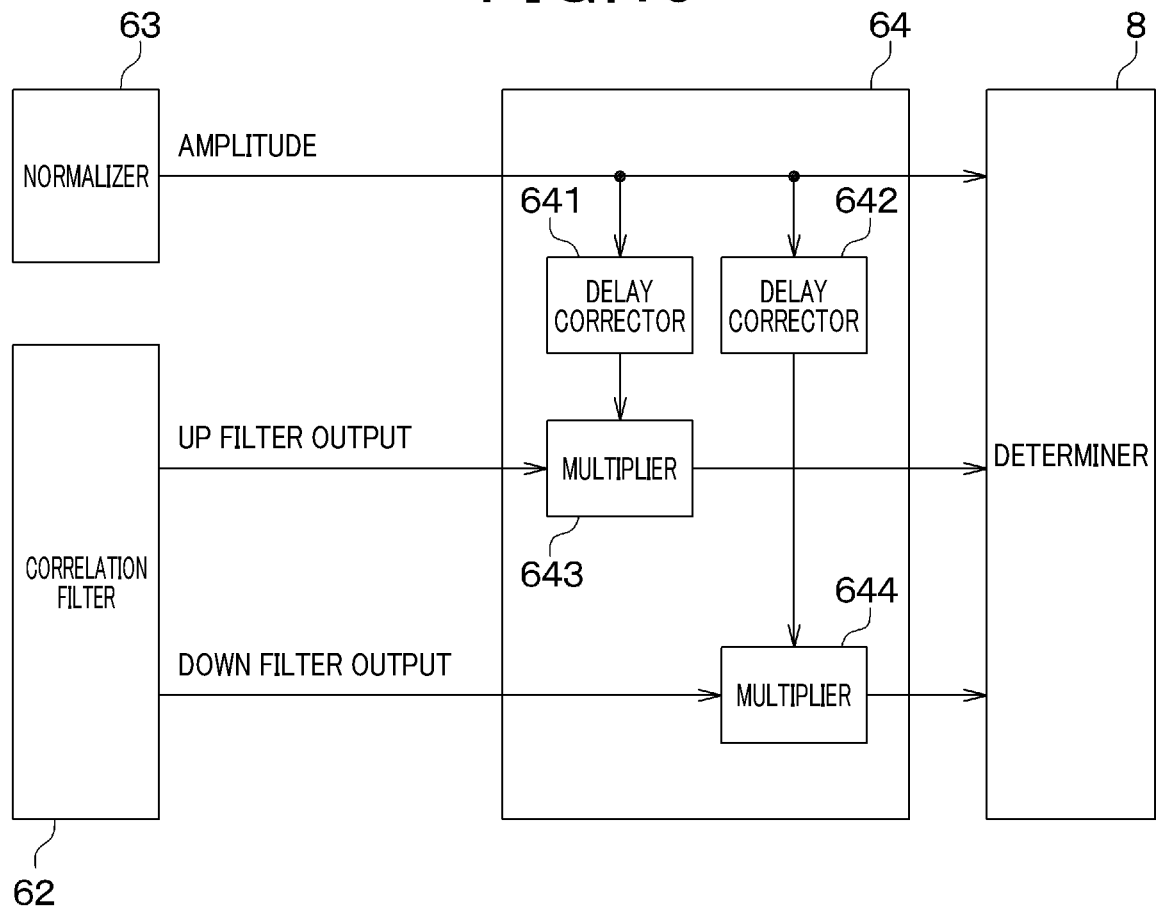
FIG. 15 is a block diagram of a corrector illustrated in FIG. 13.

The corrector 64 corrects the amplitudes and the like of the correlation signals output from the correlation filter 62. As illustrated in FIG. 15, the corrector 64 includes delay correctors 641 and 642, and multipliers 643 and 644. The delay correctors 641 and 642 delay the phase of the amplitude signal output from the normalizer 63 according to phase delays of the output signals of the up-chirp filter 620A and the down-chirp filter 620B. The delay correctors 641 and 642 receive the amplitude signal generated by the moving average filter 632 of the normalizer 63, and the amplitude signals delay-corrected by the delay correctors 641 and 642 are output to the multipliers 643 and 644, respectively.

Each of the multipliers 643 and 644 multiplies the amplitude of the correlation signal output from the corresponding one of the up-chirp filter 620A and the down-chirp filter 620B of the correlation filter 62 by the amplitude before normalization and restore it to its original magnitude. This enables the determiner 8 to make a code determination and an object detection determination by comparing the original amplitude with a predefined threshold value. The amplitude signal whose amplitude has been restored to its original magnitude by each of the multipliers 643 and 644 is output to the determiner 8.

Figure 12:
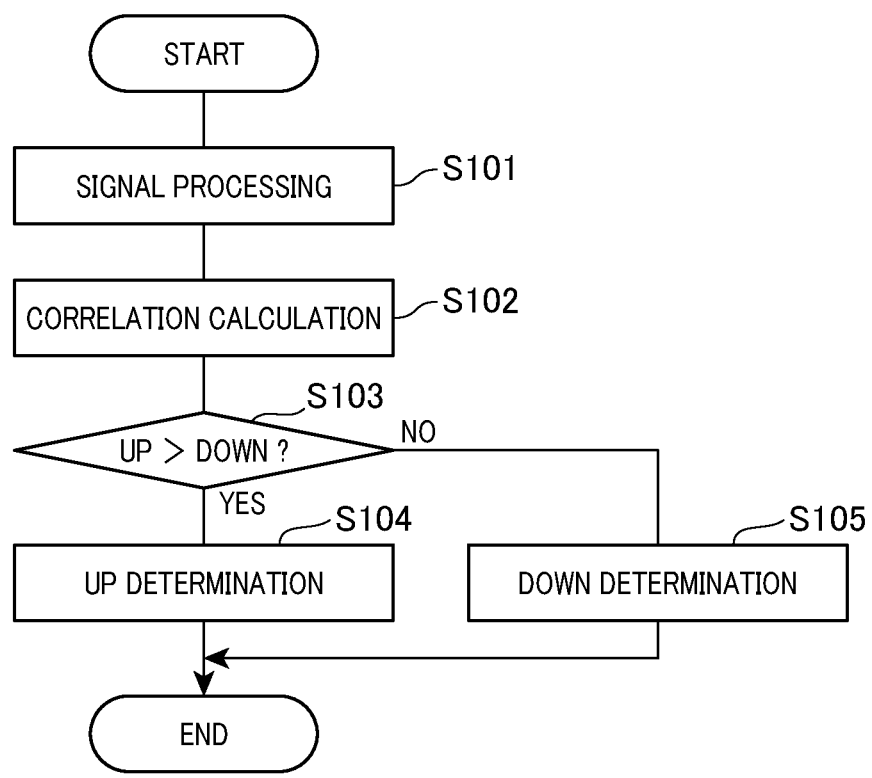
FIG. 12 is a flowchart of an object detection process.

In the object detection process of the present embodiment, at step S101 in FIG. 12, after the quadrature detector 61 converts the reception signal into a complex reception signal, the normalizer 63 normalizes the complex reception signal output from the quadrature detector 61 to set the amplitude to one. The complex reference signal output from the quadrature detector 71 is normalized by the normalizer 72 to have an amplitude of one. At step S102, the correlation filter 62 performs correlation detection between the normalized complex reception signal and each of the normalized complex reference signals, and at step S103, the determiner 8 makes a code determination based on the result of correlation detection.

Figure 16:
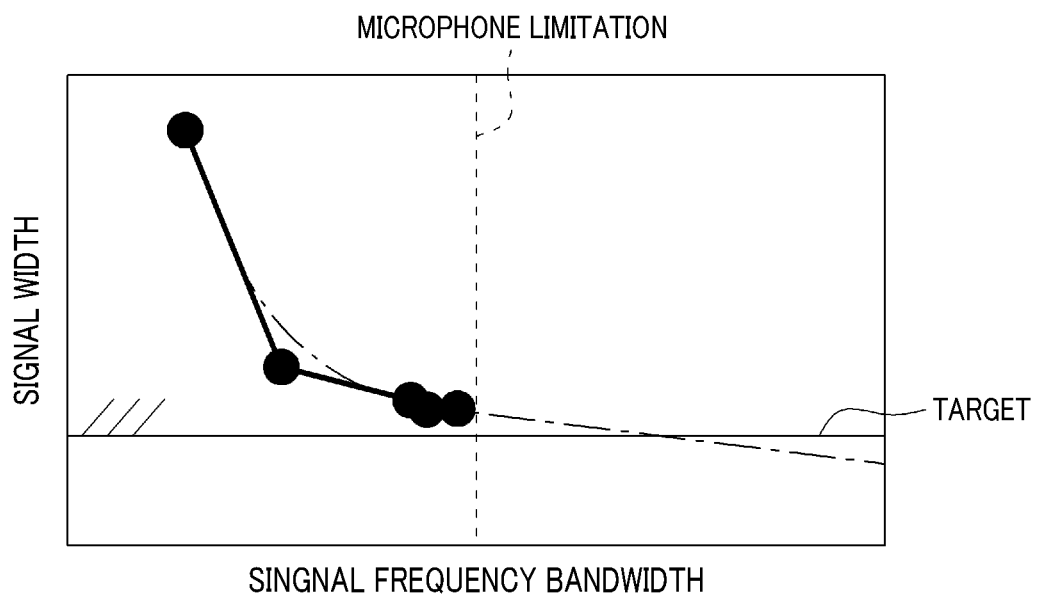
FIG. 16 is an illustration of a relationship between frequency bandwidth and signal width of a probe wave.

Advantages of the present embodiment will now be described. The signal width of output of the correlation filter 62 is inversely proportional to the frequency bandwidth of the reception signal, as illustrated in FIG. 16. The broader the frequency bandwidth, the narrower the signal width of the filter output. FIG. 16 illustrates the signal widths measured by the inventors by varying the frequency bandwidth, and the dashed-dotted line is an approximate curve of the measurements.

Figure 17:
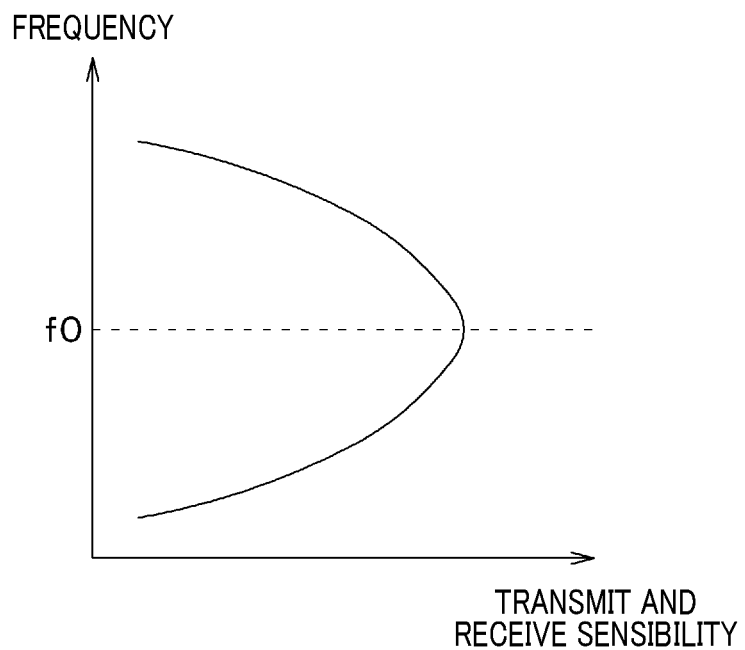
FIG. 17 an illustration of the transmit and receive sensitivity of a transducer.

Since there are a plurality of reflection points in an obstacle with a complicated shape, it is desirable to narrow the signal width of the filter output in order to achieve a high accuracy of code determination. However, a microphone used as a transducer in an onboard sensor has a narrow band frequency characteristic, as illustrated in FIG. 17. That is, when a microphone with such characteristics is used for the transducer 41, the transmit and receive sensitivity is high near the resonant frequency f0 that is the resonant frequency of the transducer 41, but at frequencies away from the resonant frequency f0, the transmit and receive sensitivity is low.

Thus, for example, when transmitting a chirp signal such that fc=f0, the component at the center frequency fc becomes larger while the components at frequencies away from the center frequency fc become smaller. Only the components at or near the center frequency fc of the entire band can be fully utilized.

Figure 18:
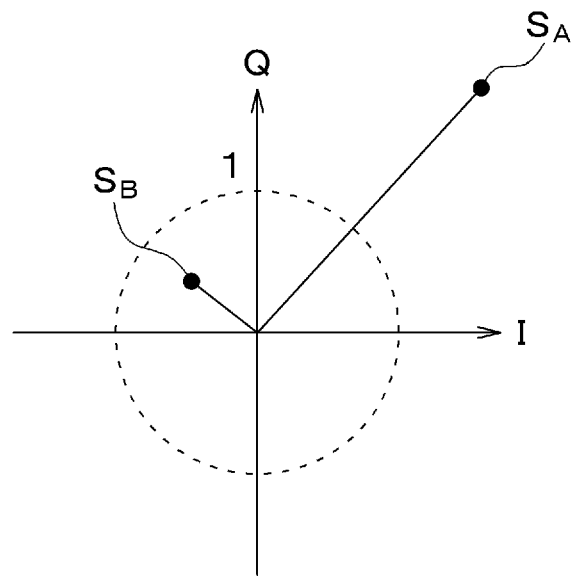
FIG. 18 is an illustration of complex reception signals before being normalized.

Specifically, assuming that, among the signals $S_1$ to $S_N$ forming the complex reception signal, the signal corresponding to the resonant frequency f0 is $S_A$ and the signal corresponding to a frequency away from the resonant frequency f0 is $S_B$, the amplitudes of the signals $S_A$ and $S_B$ are, for example, as illustrated in FIG. 18. That is, the amplitude of the signal $S_A$ is greater than one, and the amplitude of the signal $S_B$ is less than one.

As illustrated in FIG. 16, the hardware limitation of such a microphone makes it difficult to reduce the signal width of the filter output to a desirable value, which may cause an erroneous determination of the code when detecting an obstacle with a complicated shape, such as a vehicle or a fence. As illustrated in FIG. 18, large differences in amplitude between signals $S_1$-$S_N$ with frequency may cause the result of correlation detection to be affected by the amplitudes near the resonant frequency f0, leading to an erroneous determination of the code.

Figure 19:
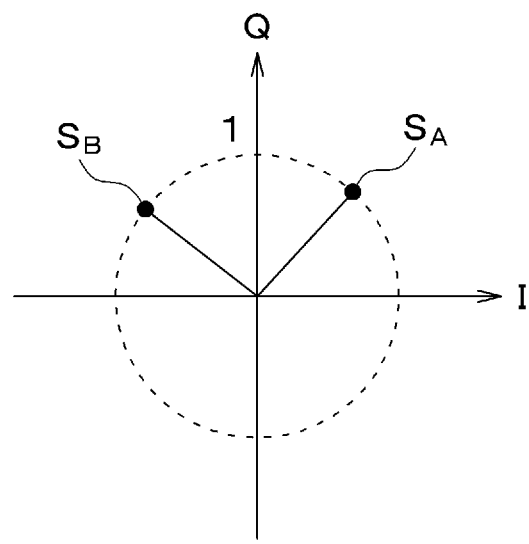
FIG. 19 is an illustration of complex reception signals after being normalized.
Figure 20:
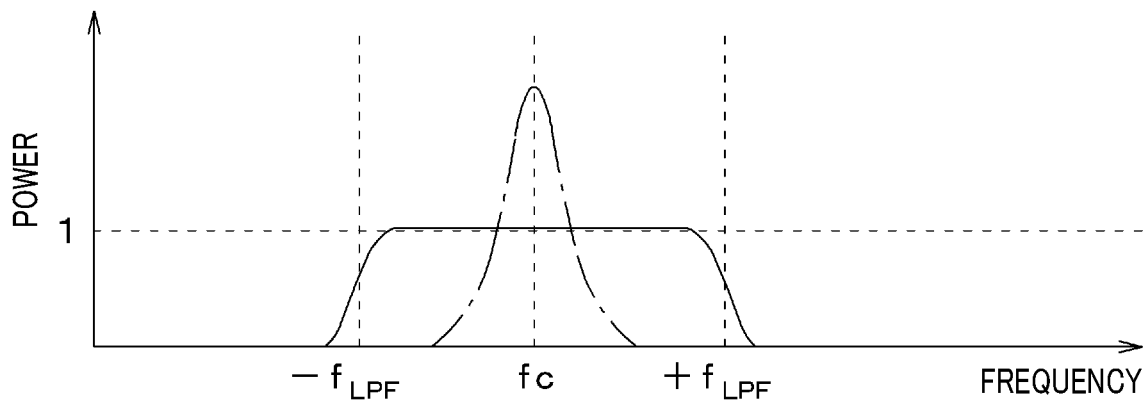
FIG. 20 is an illustration of broadening of the frequency band arising from normalization.

In contrast, in the present embodiment, the complex reception signal output from the quadrature detector 61 is normalized by the normalizer 63 prior to correlation detection. That is, as illustrated in FIG. 19, the amplitudes of the signals $S_1$ to $S_N$ are made equal to one. In FIG. 19, only signals $S_A$ and $S_B$ are shown among the signals $S_1$ to $S_N$. This can reduce the effect on the frequency characteristics of the microphone. As illustrated in FIG. 20, the frequency band of the reception signal becomes broader and the signal width after correlation detection becomes narrower, thus enabling suppression of erroneous code determination.

FIG. 20 illustrates changes in the frequency band arising from normalization. In FIG. 20, the dashed-dotted line indicates the amplitude of the complex reception signal generated by the quadrature detector 61, and the solid line indicates the amplitude of the complex reception signal normalized by the normalizer 63. In FIG. 20, fLPF is the cut-off frequency of the LPF 612.

Thus, the effect on the frequency characteristics of the microphone is decreased by the normalizer 63 normalizing the reception signal that varies in amplitude due to the frequency characteristics of the transducer 41.

Figure 21:
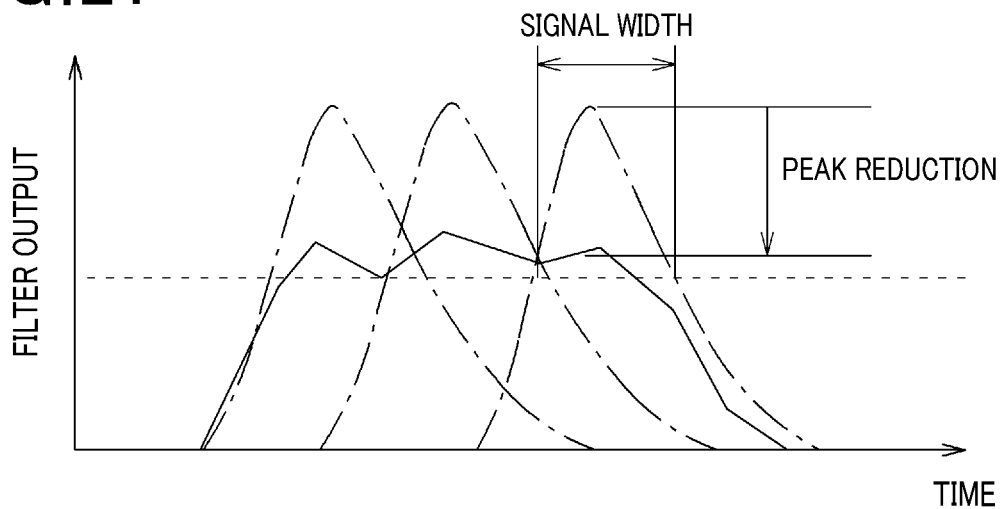
FIG. 21 is an illustration of filter outputs in a comparative example.

For example, when a probe wave is transmitted toward an object with a complicated shape, such as a fence, a plurality of reflected waves may be returned. If correlation detection is performed without normalization of the complex reception signal, the peak of the correlation output will be lower than the amplitude signal of the original probe wave indicated by the dashed-dotted line, as illustrated in FIG. 21. For example, setting the threshold for reflected wave detection as indicated by the dashed line results in a larger signal width and reduced resolution due to interference from reflected waves.

Figure 22:
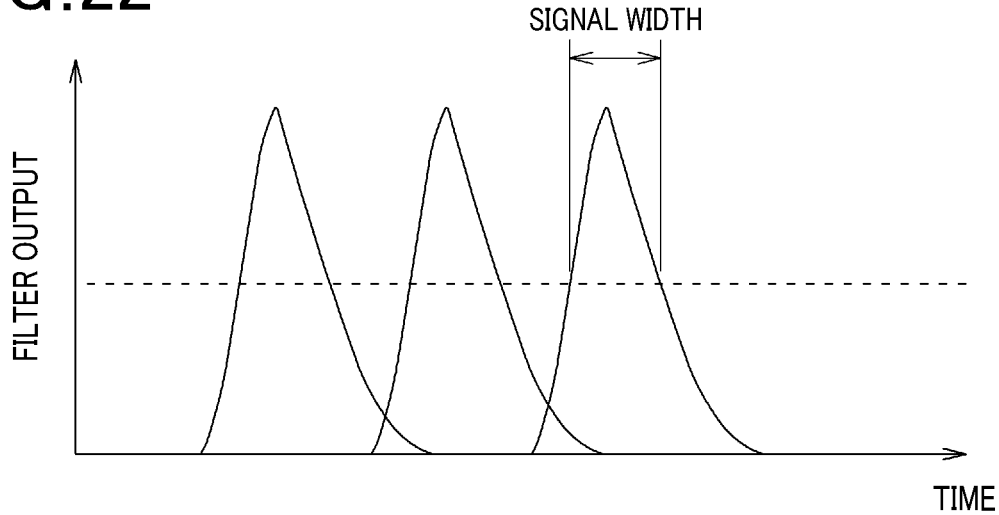
FIG. 22 is an illustration of filter outputs in a second embodiment.

In contrast, normalization of the complex reception signal suppresses reduction of the peak of the correlation output, reduces the signal width, and suppresses the reduction of resolution due to interference from reflected waves, as illustrated in FIG. 22.

As described above, in the present embodiment, the complex reception signal is normalized prior to correlation detection, which reduces the effect on the frequency characteristics of the transducer 41. This can suppress reduction of the peak of the correlation output and can improve the resolution by decreasing the signal width, which improves the accuracy of code determination. In addition, normalizing the amplitude of the complex signal to one allows the operations to be simplified by a known formula. Normalization of the complex reference signal prior to correlation detection can further reduce the effect on the frequency characteristics of the transducer 41. Normalization of the complex reference signals allows them to be treated as trigonometric functions, which can facilitate conversion to rotation matrices, thereby further reducing the amount of calculation.

Third Embodiment

A third embodiment will now be described. This embodiment is different from the second embodiment in that a configuration for rotating the phases of the complex signals is added, and the other parts are similar to those of the second embodiment. Therefore, only the differences from the second embodiment will be described.

Figure 23:
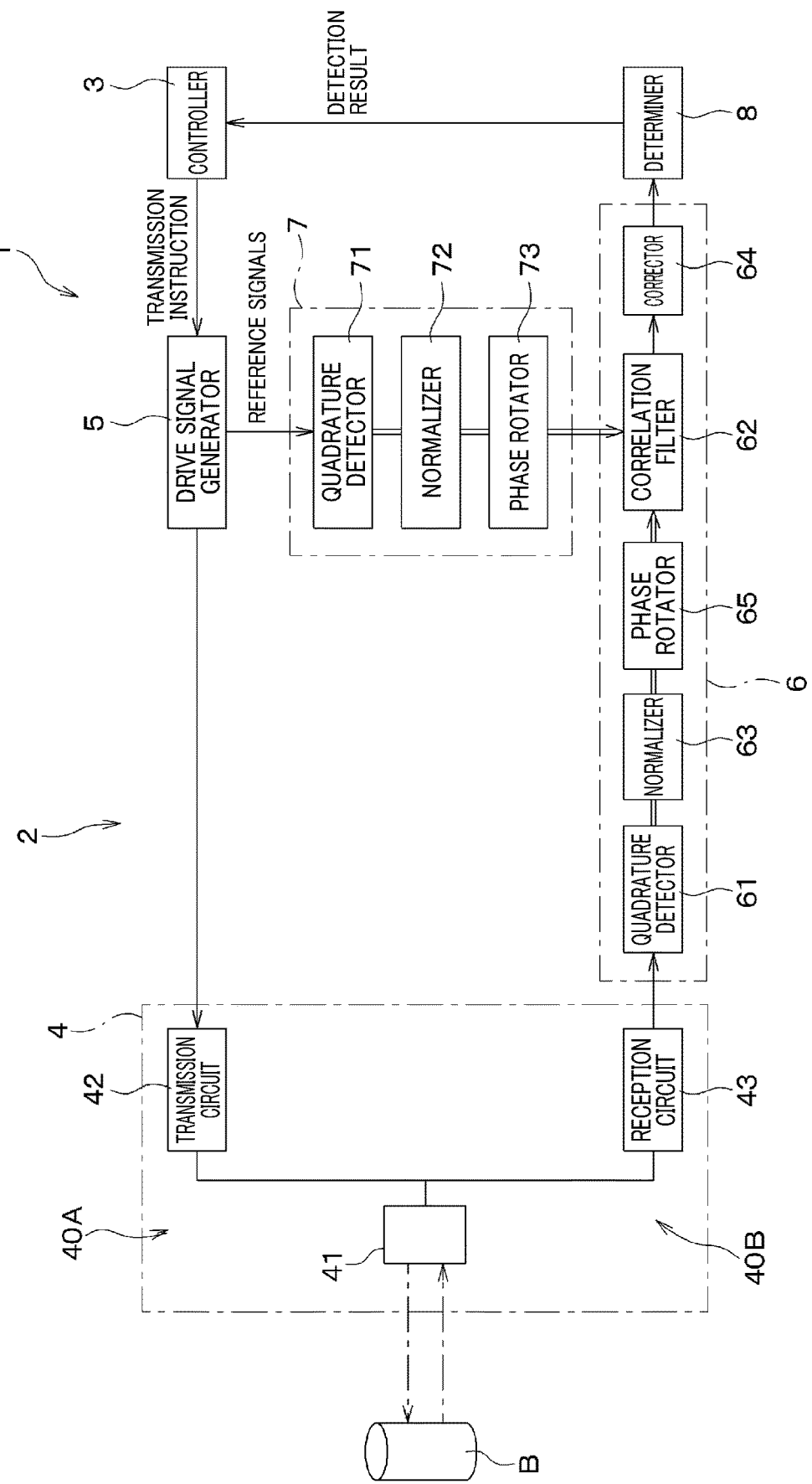
FIG. 23 is a block diagram of an object detection device according to a third embodiment.

The object detection device 1 of the present embodiment has a configuration to further broadens the frequency band of the reception signal by phase rotation. As illustrated in FIG. 23, the matched filter 6 of the present embodiment includes a phase rotator 65, in addition to the quadrature detector 61, the correlation filter 62, the normalizer 63, and the corrector 64. The reference signal processor 7 includes a phase rotator 73, in addition to the quadrature detector 71 and the normalizer 72. The drive signal generator 5, the matched filter 6, the reference signal processor 7, and the determiner 8 are configured, for example, as a DSP having the functions programmed, such as the above-described drive signal generation, quadrature detection, normalization, correlation detection, delay correction, amplitude correction, code determination, object detection determination, and phase rotation and the like as described later.

The phase rotator 65 rotates the phase of the complex reception signal. The phase rotator 65 corresponds to a first phase rotator. The phase rotator 65 receives the complex reception signal normalized by the normalizer 63. The complex reception signal whose phase is rotated by the phase rotator 65 is output to the correlation filter 62.

The phase rotator 65 specifically processes the received signal as follows. That is, using $I'=\cos\theta$, $Q'=\sin\theta$, $\cos 2\theta=1-2\sin^2\theta$, and $\sin 2\theta=2\sin\theta\cos\theta$, $\cos 2\theta$ and $\sin 2\theta$ are calculated from $I'$ and $Q'$, where $I'$ is the real part of the normalized complex reception signal, $Q'$ is the imaginary part of the normalized complex reception signal, and $\theta$ is the phase. The real and imaginary parts of the new complex reception signal are output as $\cos 2\theta$ and $\sin 2\theta$, respectively.

The phase rotator 73 rotates the phase of each of the complex reference signals. The phase rotator 73 corresponds to a second phase rotator. The phase rotator 73 receives the complex reference signal normalized by the normalizer 72, and the complex reference signal whose phase is rotated by the phase rotator 73 is output to the correlation filter 62. In the phase rotator 73, phase rotation is performed in the same manner as in the phase rotator 65. The correlation filter 62 performs correlation detection between the phase-rotated complex reception signal and each of the phase-rotated complex reference signals, and outputs correlation signals.

Figure 24:
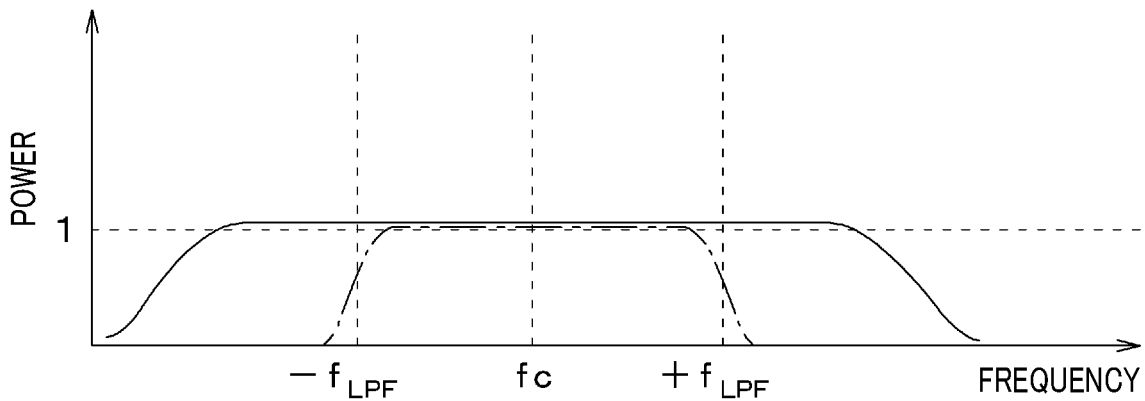
FIG. 24 is an illustration of broadening of the frequency band arising from phase rotation.

FIG. 24 illustrates changes in the frequency band arising from phase rotation. In FIG. 24, the dashed-dotted line indicates the amplitude of the complex reception signal normalized by the normalizer 63, and the solid line indicates the amplitude of the complex reception signal phase rotated by the phase rotator 65. As described in the second embodiment, normalization broadens the frequency band while the phase rotation further broadens the apparent frequency band, as illustrated in FIG. 24.

The amount of phase rotation is equal to an integral multiple, e.g., twice as above. Alternatively, the phase may be rotated by other multiples. For example, in the phase rotators 65 and 73, a twice the phase rotation may be performed twice and a signal with four times the phase rotated may be output, such as $\cos 4\theta=1-2\sin^2 2\theta$ and $\sin 4\theta=2\sin 2\theta\cos 2\theta$.

The amount of phase rotation may be changed according to a predefined condition. For example, the higher the magnification ratio, the broader the frequency band after phase rotation. However, since the effect of Doppler shift increases, the magnification ratio may be lower than the predefined value when traveling straight ahead at a high vehicle speed and higher than the predefined value when reversing at a low vehicle speed.

In the object detection process of the present embodiment, at step S101 in FIG. 12, the quadrature detector 61 converts the reception signal into a complex signal, the normalizer 63 normalizes the complex reception signal, and then the phase rotator 65 performs phase rotation by rotating the phase of the normalized complex reception signal. After the normalizer 72 normalizes each complex reference signal output from quadrature detector 71, the phase rotator 73 performs phase rotation by rotating the phase of each normalized complex reference signal. At step S102, the correlation filter 62 performs correlation detection between the phase-rotated complex reception signal and each of the phase-rotated complex reference signals, and at step S103, the determiner 8 makes a code determination based on this correlation detection result.

Figure 25:
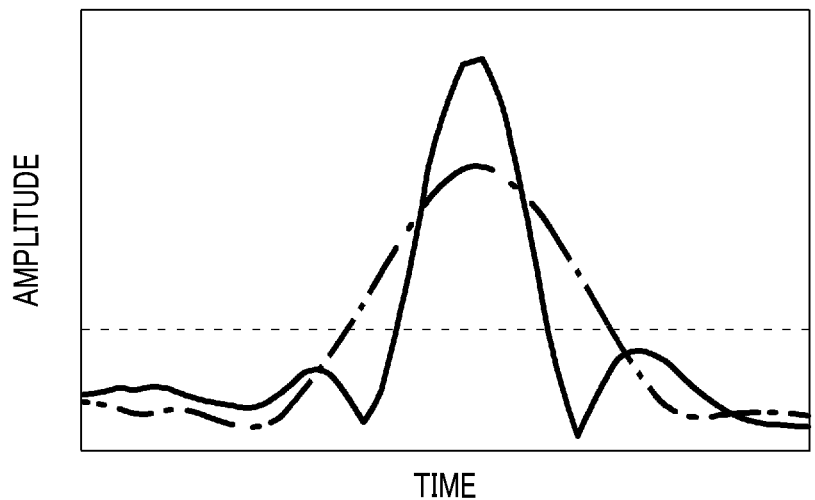
FIG. 25 is an illustration of filter outputs corresponding to an up-chirp signal.
Figure 26:
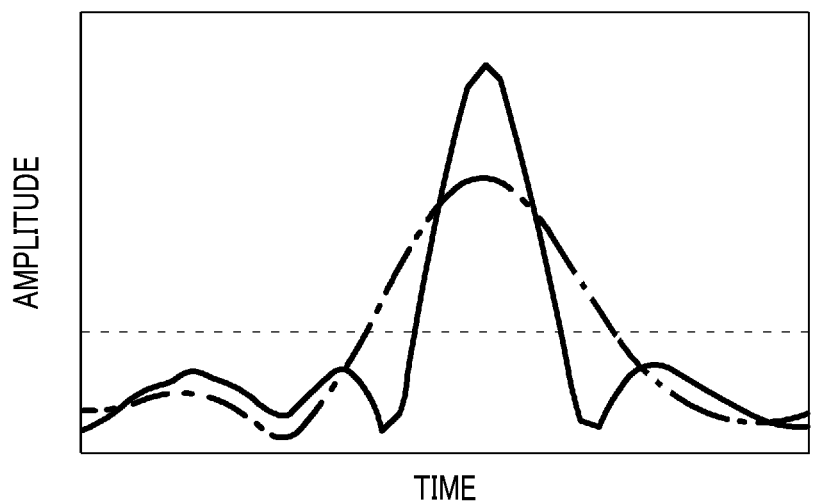
FIG. 26 is an illustration of filter outputs corresponding to a down-chirp signal.

Advantages of the present embodiment will now be described. FIGS. 25 and 26 illustrate results of experiments conducted by the inventors, showing outputs of the correlation filter 62 when a probe wave was transmitted toward a pole with a diameter of 60 mm. In these experiments, chirp signals with a narrower frequency modulation range than the chirp signals in the probe waves were used as the reference signals. Specifically, the lower and upper limits of the frequency modulation range of the probe wave were set to f1 and f2, respectively, and the lower and upper limits of the frequency modulation range of the reference signals were set to f3 and f4, respectively, such that f1<f3<f4<f2.

FIG. 25 illustrates the output of the up-chirp filter 620A when a probe wave that includes an up-chirp signal is transmitted, and FIG. 26 illustrates the output of the down-chirp filter 620B when a probe wave that includes a down-chirp signal is transmitted. In each of FIGS. 25 and 26, the solid line indicates the correlation output when phase rotation is performed, the dashed-dotted line indicates the correlation output when phase rotation is not performed, and the dashed line indicates a threshold for reflected wave detection. As illustrated in FIGS. 25 and 26, the phase rotation reduces the signal widths of the output signals of the correlation filter 62.

Figure 27:
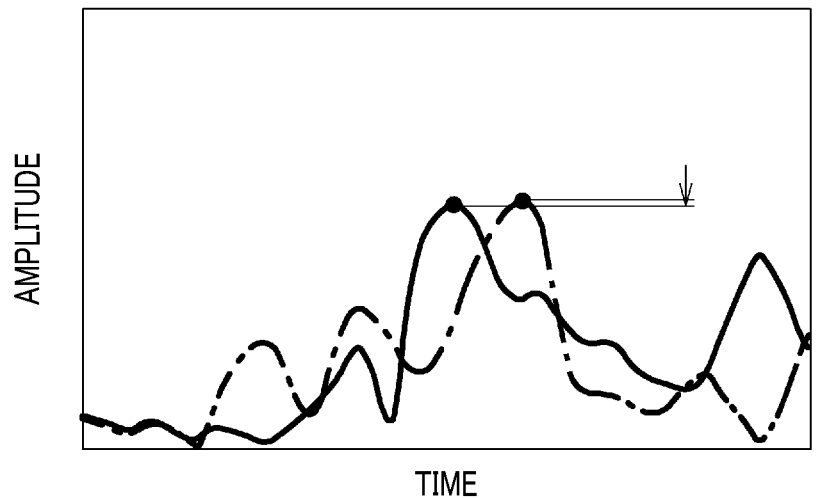
FIG. 27 is an illustration of filter outputs in a comparative example.
Figure 28:
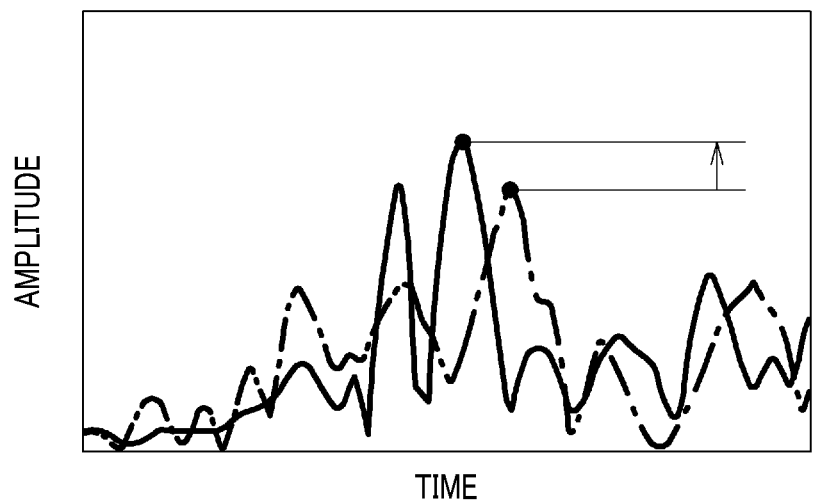
FIG. 28 is an illustration of filter outputs in a third embodiment.

Each of FIG. 27 and FIG. 28 illustrates the output of the correlation filter 62 when a probe wave including a down-chirp signal was transmitted wave toward a mesh fence. FIG. 27 is an example of output signals of the correlation filter 62 when no phase rotation was performed, and FIG. 28 is an example of output signals of the correlation filter 62 when phase rotation was performed. In each of FIG. 27 and FIG. 28, the solid line indicates the output signal of the down chirp filter 620B, and the dashed-dotted line indicates the output signal of the up-chirp filter 620A.

In FIG. 27, the output peak of the up-chirp filter 620A is greater than the output peak of the down-chirp filter 620B. Thus, it is erroneously determined that the reception signal includes an up-chirp signal. On the other hand, in FIG. 28, the output peak of the down-chirp filter 620B is greater than the output peak of the up-chirp filter 620A. Therefore, it is correctly determined that the reception signal includes a down-chirp signal.

Without phase rotation, there is a risk of occurrence of erroneous determinations as described above, while with phase rotation, the output signals of the up-chirp filter 620A and down-chirp filter 620B are less dull, as illustrated in FIG. 28, resulting in fewer erroneous determinations. In experiments conducted by the inventors, addition of the phase rotation process improved the code recognition rate from 88% to 95% when probe waves were transmitted toward the mesh fence.

As described above, in the present embodiment, phase rotation of the complex signals leads to more reduced signal widths and improves the accuracy of code determination. Since the complex reception signal and the complex reference signals are normalized prior to phase rotation, the phase rotation process may be performed using the double-angle formulae as described above, thereby reducing the amount of calculation for phase rotation.

OTHER EMBODIMENTS

The present disclosure should not be limited to the embodiments described above and can be modified as deemed appropriate. Needless to say, in the above-described embodiments, the components of the embodiments should not be necessarily deemed to be essential unless explicitly described or they are fundamentally and obviously essential, for example.

Figure 29:
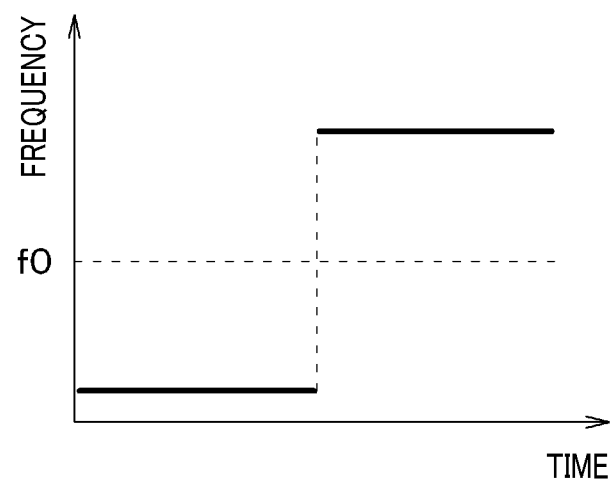
FIG. 29 is an illustration of probe wave frequencies in another embodiment.

For example, as illustrated in FIG. 29, each of the probe wave and reference signals may be formed of a component of one frequency lower than the resonant frequency f0 of the transducer 41 and a component of one frequency higher than the resonant frequency. Using a probe wave of a frequency different from the resonant frequency f0 of the transducer 41 in this manner can reduce the effects on the frequency characteristics of the transducer 41 and improve robustness of the object detection device 1. In FIG. 29, the frequency of the probe wave is modulated from a frequency lower than the resonant frequency f0 to a frequency higher than the resonant frequency f0. Alternatively, the frequency of the probe wave may be modulated from a frequency higher than the resonant frequency f0 to a frequency lower than the resonant frequency f0.

In the second embodiment, the complex reception signal and the complex reference signals are all normalized. In an alternative embodiment, only the complex reference signals may be normalized, without normalizing the complex reception signal. In an alternative embodiment, only the complex reception signal may be normalized without normalizing the complex reference signals.

Figure 30:
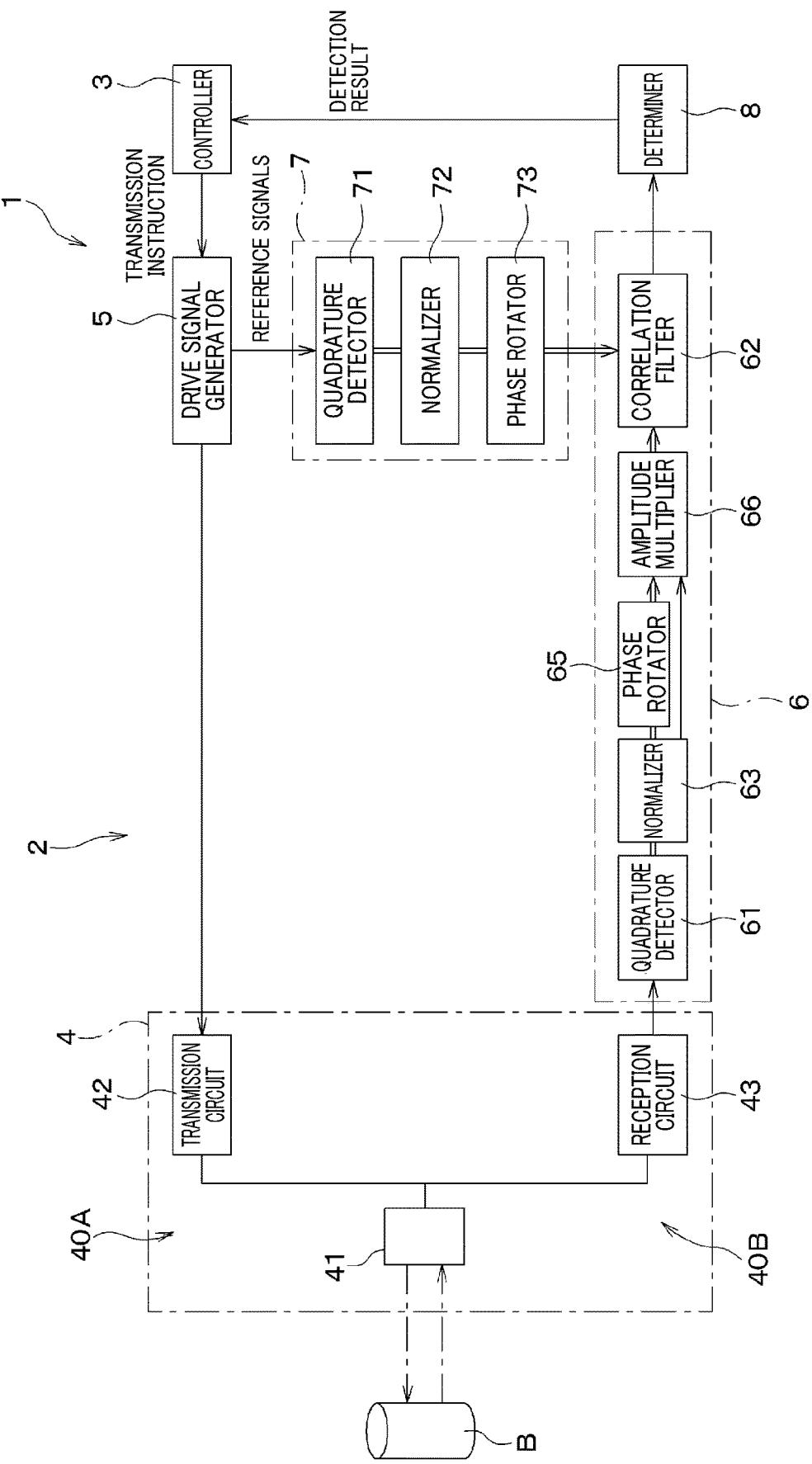
FIG. 30 is a block diagram of an object detection device according to another embodiment.

In an alternative embodiment to the above third embodiment, the normalized and phase-rotated complex reception signal may be restored to its original amplitude before performing correlation detection. For example, as illustrated in FIG. 30, the matched filter 6 includes an amplitude multiplier 66. The complex reception signal that has been phase-rotated by the phase rotator 65 and the amplitude calculated by the normalizer 63 are input to the amplitude multiplier 66. The amplitude multiplier 66 multiplies the complex reception signal by the amplitude before normalization to restore the amplitude of the complex reception signal, and outputs the amplitude restored complex reception signal to the correlation filter 62. In such an embodiment, correction of the amplitude by the corrector 64 is not needed. Similarly, the normalized complex reference signals may be restored to their original amplitudes before performing correlation detection.

In an alternative embodiment, the phase rotators 65 and 73 may be added to the first embodiment to perform phase rotation of the complex reception signal and the complex reference signals output from the quadrature detectors 61 and 71.

In the above-described embodiments and modifications, the drive signal generator, the matched filter, the reference signal processor, the determiner, the controller and the like and the method of them described in the present disclosure may be implemented by a dedicated computer including a processor and a memory programmed to execute one or more functions embodied by computer programs. Alternatively, the drive signal generator, the matched filter, the reference signal processor, the determiner, the controller and the like and the method of them described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium.

What is claimed is:

1. An object detection device comprising:
   a transceiver that transmits ultrasonic waves encoded with frequency modulation and receives an ultrasonic wave and outputs a reception signal;
   a first quadrature detector that generates and outputs a complex reception signal based on quadrature detection of the reception signal;
   a second quadrature detector that generates and outputs a complex reference signal based on quadrature detection of the reference signal;
   a correlation filter that performs correlation detection between the complex reception signal and the complex reference signal and outputs a correlation signal; and
   a code determiner that determines a code included in the reception signal based on the correlation signal.

2. The object detection device according to claim 1, further comprising:
   a first normalizer that normalizes the complex reference signal such that its amplitude is constant, wherein the correlation filter performs correlation detection between the complex reception signal and the complex reference signal normalized by the first normalizer.

3. The object detection device according to claim 2, further comprising:
a second normalizer that normalizes the complex reception signal such that its amplitude is constant, wherein
the correlation filter performs correlation detection between the complex reception signal normalized by the second normalizer and the complex reference signal normalized by the first normalizer.

4. The object detection device according to claim 3, further comprising:
a corrector that corrects the correlated signal, wherein
the second normalizer normalizes the complex reception signal by dividing the complex reception signal by its original amplitude,
the corrector corrects the correlation signal by multiplying the correlation signal by the amplitude of the complex reception signal before being normalized, and
the code determiner determines the code included in the reception signal based on the correlation signal corrected by the corrector.

5. The object detection device according to claim 1, further comprising:
a first phase rotator that rotates a phase of the complex reception signal; and
a second phase rotator that rotates a phase of the complex reference signal, wherein
the correlation filter performs correlation detection between the complex reception signal rotated in phase by the first phase rotator and the complex reference signal rotated in phase by the second phase rotator.

6. The object detection device according to claim 5, wherein
the first phase rotator rotates the phase of the normalized complex reception signal.

7. The object detection device according to claim 5, wherein
the second phase rotator rotates the phase of the normalized complex reference signal.

8. The object detection device according to claim 5, wherein
the first phase rotator and the second phase rotator change an amount of phase rotation according to a predefined condition.

9. The object detection device according to claim 1, wherein
the first quadrature detector down-samples and outputs the complex reception signal, and
the second quadrature detector down-samples and outputs the complex reference signal.

10. The object detection device according to claim 1, wherein
a frequency of the ultrasonic wave transmitted from the transceiver and a frequency of the reference signal are different from a resonant frequency of the transceiver.

* * * * *